United States Patent
Nam et al.

(10) Patent No.: US 11,263,338 B2
(45) Date of Patent: Mar. 1, 2022

(54) DATA SECURITY MAINTENANCE METHOD FOR DATA ANALYSIS APPLICATION

(71) Applicant: SENTIENCE INC., Seoul (KR)

(72) Inventors: Ki Hwan Nam, Seoul (KR); Myun Soo Kim, Goyang-si (KR)

(73) Assignee: SENTIENCE INC., Seoul (KR)

( * ) Notice: Subject to any disclaimer, the term of this patent is extended or adjusted under 35 U.S.C. 154(b) by 391 days.

(21) Appl. No.: 16/472,553

(22) PCT Filed: Oct. 16, 2017

(86) PCT No.: PCT/KR2017/011376
§ 371 (c)(1),
(2) Date: Jun. 21, 2019

(87) PCT Pub. No.: WO2019/078374
PCT Pub. Date: Apr. 25, 2019

(65) Prior Publication Data
US 2021/0049294 A1    Feb. 18, 2021

(30) Foreign Application Priority Data

Oct. 16, 2017    (KR) .................. 10-2017-0133720

(51) Int. Cl.
*G06F 21/62* (2013.01)
*G06F 16/25* (2019.01)
*G06F 21/64* (2013.01)

(52) U.S. Cl.
CPC ........ *G06F 21/6227* (2013.01); *G06F 16/258* (2019.01); *G06F 21/6254* (2013.01); *G06F 21/64* (2013.01)

(58) Field of Classification Search
CPC .... G06F 16/258; G06F 21/6227; G06F 21/64; G06F 21/62; G06F 21/6218; G06F 21/6245; G06F 21/6254
See application file for complete search history.

(56) References Cited

U.S. PATENT DOCUMENTS

| | | |
|---|---|---|
| 2004/0267751 A1 | 12/2004 | Dill et al. |
| 2014/0122445 A1 | 5/2014 | Hashimoto et al. |
| 2014/0123304 A1* | 5/2014 | Rachlin .................. G06F 21/60 726/26 |

(Continued)

FOREIGN PATENT DOCUMENTS

| | | |
|---|---|---|
| KR | 10-2009-0112016 A | 10/2009 |
| KR | 10-2016-0066395 A | 6/2016 |
| KR | 10-2016-0112744 A | 9/2016 |

*Primary Examiner* — Theodore C Parsons
(74) *Attorney, Agent, or Firm* — Novick, Kim & Lee, PLLC; Jae Youn Kim

(57) ABSTRACT

Proposed is a data security maintenance method for data analysis application, including a data selection step of selecting data to be analyzed from a linked database management system (DBMS), a data request step of requesting the data to be analyzed, a data transformation step of transforming the data to be analyzed using a predetermined transformation method, a data analysis step of analyzing the transformed data to be analyzed, an error comparison step of comparing analysis errors for each transformation method, a tradeoff step of determining the extent of analysis accuracy and the extent of data security, and a data provision step of providing the result of analysis of the data to be analyzed.

5 Claims, 2 Drawing Sheets

(56) References Cited

U.S. PATENT DOCUMENTS

| | | | | |
|---|---|---|---|---|
| 2015/0286827 A1* | 10/2015 | Fawaz | ...................... | H04L 9/00 |
| | | | | 726/26 |
| 2016/0365974 A1* | 12/2016 | Cardno | ............... | G06F 21/6254 |
| 2016/0379011 A1* | 12/2016 | Koike | ................. | G06F 21/6254 |
| | | | | 726/26 |
| 2017/0039222 A1* | 2/2017 | Farrow | ................... | G06F 16/29 |
| 2017/0277767 A1* | 9/2017 | Dang | ................. | G06F 21/6254 |
| 2018/0004978 A1* | 1/2018 | Hebert | ................ | G06F 21/6254 |
| 2018/0052894 A1* | 2/2018 | Eide | ........................ | G06F 7/582 |
| 2018/0189515 A1* | 7/2018 | Wang | ................. | G06F 21/6254 |

\* cited by examiner

Raw data

| CUSTOMER ID | NUMBER OF CUSTOMER PURCHASES | CUSTOMER'S TOTAL PURCHASE EXPENDITURE | NUMBER OF CUSTOMER VISITS |
|---|---|---|---|
| AAA | 43 | 265600 | 103 |
| BBB | 24 | 120000 | 91 |

Processed data

| CUSTOMER ID | NUMBER OF CUSTOMER PURCHASES | CUSTOMER'S TOTAL PURCHASE EXPENDITURE | NUMBER OF CUSTOMER VISITS |
|---|---|---|---|
| AAA | 0.71 | 0.69 | 0.59 |
| BBB | 0.35 | 0.46 | 0.48 |

FIG. 2

DATA SECURITY MAINTENANCE METHOD FOR DATA ANALYSIS APPLICATION

TECHNICAL FIELD

The present invention relates to a method of maintaining the security of data even when the data are analyzed, and more particularly to a method of transforming data to be analyzed while maintaining the characteristics of the data and then performing data analysis, whereby data security is maintained, and at the same time, efficient data analysis is performed.

BACKGROUND ART

As the result of the spread of the digital economy, a big-data environment, in which an enormous amount of information and data are produced, has come in recent years. Big data are large-scale data that are huge compared to data generated in the past analog environment, have short production cycles, and include text and image data as well as numerical data.

Such various huge data have lately attracted considerable attention in that the data may be utilized as an important resource that influences future competitiveness.

Since ancient times, attempts have been made to analyze large-scale data in order to find meaningful information. In the current big-data environment, however, a paradigm shift has been made from the aspects of the quality and variety of data as well as the amount of data, compared to the past. As a result, the necessity and demand for data analysis have exponentially increased.

According to this trend, data security has come to the fore as a big problem. The reason for this is that it is necessary to provide the actual data or to open detailed information about the data to the public in order to analyze the data.

As a result, in the current situation, efficient data analysis is difficult in the case in which only data security is emphasized, whereas data security is deteriorated in the case in which only data analysis is emphasized.

In order to solve the above problems, it is necessary to provide a novel data analysis method that is capable of efficiently performing data analysis while maintaining the security of data.

DISCLOSURE

Technical Problem

The present invention has been made in view of the above problems, and it is an object of the present invention to provide a method that is capable of more efficiently performing data analysis while maintaining the security of data.

In other words, in order to accomplish the above object of the present invention, data are transformed using various transformation methods and based on the levels of the transformation methods while the characteristics of the data are maintained, whereby data analysis is performed while the security of the data is maintained.

The technical objects that can be achieved through the embodiments are not limited to what has been particularly described hereinabove, and other technical objects not described herein will be more clearly understood by those skilled in the art from the following detailed description.

Technical Solution

In accordance with the present invention, the above and other objects can be accomplished by the provision of a data security maintenance method for data analysis application, the data security maintenance method including a data selection step of selecting data to be analyzed from a linked database management system (DBMS), a data request step of requesting the data to be analyzed, a data transformation step of transforming the data to be analyzed using a predetermined transformation method, a data analysis step of analyzing the transformed data to be analyzed, an error comparison step of comparing analysis errors for each transformation method, a tradeoff step of determining the extent of analysis accuracy and the extent of data security, and a data provision step of providing the result of analysis of the data to be analyzed.

The data transformation step may include a step of selecting a predetermined transformation method to be used, a step of selecting the level of the selected transformation method, and a step of transforming the data to be analyzed according to the selected transformation method and the selected level.

The predetermined transformation method may include at least one of a topological transformation method, a linear transformation method, or a bicubic transformation method.

The error comparison step may include a step of calculating analysis errors for each transformation method and a step of comparing the analysis errors calculated for each transformation method.

At the data transformation step, the data to be analyzed may be transformed while the characteristics of the data to be analyzed are maintained.

In the case in which the characteristics of the data to be analyzed are maintained, both the average and variance of the data to be analyzed may be changed but the analysis result may not affected.

At the data selection step, the data to be analyzed may be selected from the linked DBMS without passing through a download procedure.

Advantageous Effects

The present invention has an effect in that it is possible to efficiently analyze a large amount of data possessed by a government agency, an enterprise, etc. while maintaining the security of the data.

In addition, the present invention has an effect in that it is possible to selectively use various transformation methods and levels of each of the transformation methods in order to maintain the security of data, whereby it is possible to obtain the analysis result with the analysis accuracy and the error rate desired by a user.

DESCRIPTION OF DRAWINGS

FIG. 2 is an illustrative view showing states before and after data transformation according to an embodiment of the present invention.

BEST MODE

Figure 1:
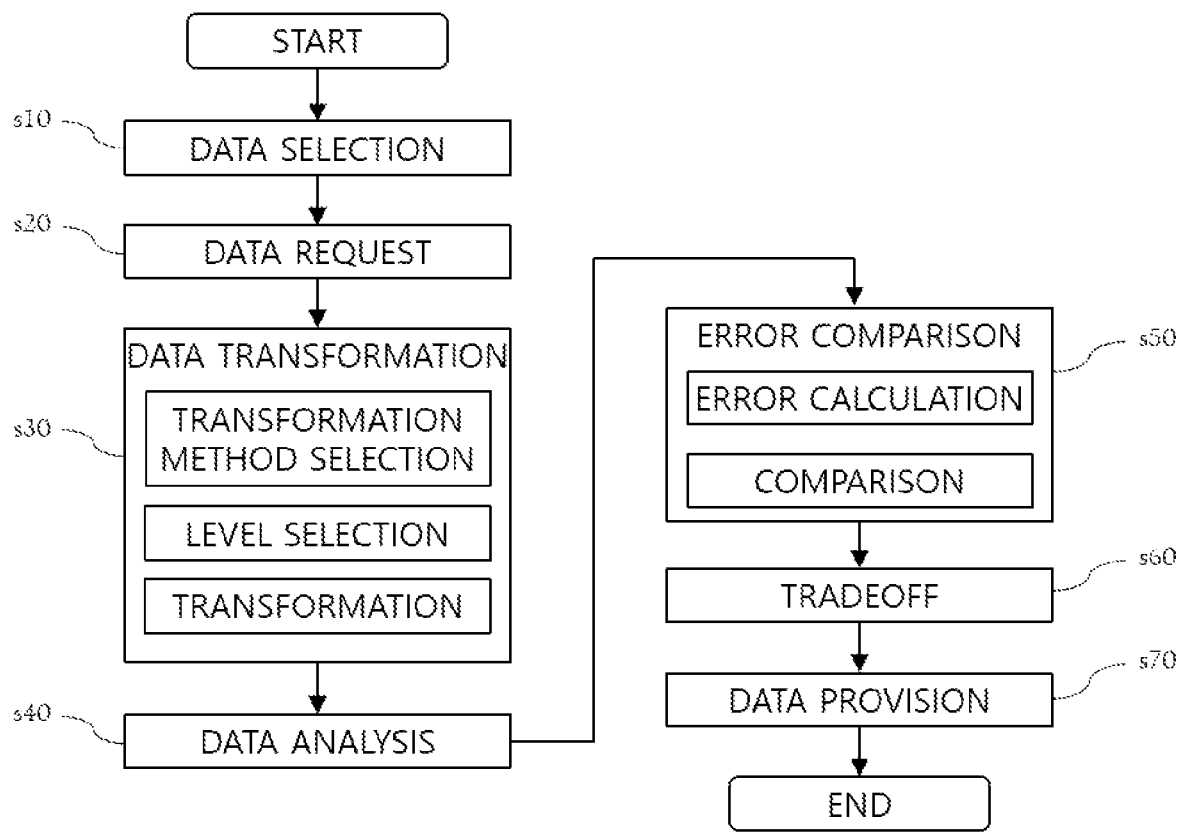
FIG. 1 is a flowchart showing a data security maintenance method for data analysis application according to an embodiment of the present invention.

In order to efficiently perform data analysis while maintaining the security of data in the big data era, the present invention provides a data security maintenance method for data analysis application, the data security maintenance method including a data selection step of selecting data to be analyzed from a linked database management system (DBMS), a data request step of requesting the data to be analyzed, a data transformation step of transforming the data to be analyzed using a predetermined transformation method, a data analysis step of analyzing the transformed data to be analyzed, an error comparison step of comparing analysis errors for each transformation method, a tradeoff step of determining the extent of analysis accuracy and the extent of data security, and a data provision step of providing the result of analysis of the data to be analyzed.

MODE FOR INVENTION

Now, the present invention will be described in detail with reference to the accompanying drawings. It should be noted that the terms or words used in this specification and the claims are not to be interpreted as having ordinary and dictionary-based meanings but as having meanings and concepts coinciding with the technical idea of the present invention based on the principle that the inventors may appropriately define the concepts of the terms in order to explain the invention in the best method. Consequently, the embodiments described in this specification are merely the most preferred embodiments and do not cover the entire technical scope of the present invention, and therefore it should be understood that there may be various equivalents and modifications capable of substituting for the embodiments at the time of filing of the present application.

The terms used in this specification are used to describe specific embodiments and do not limit the present invention. In this specification, singular forms are intended to include plural forms as well, unless the context clearly indicates otherwise.

In order to efficiently perform data analysis while maintaining the security of data in the big data era, the present invention provides a data security maintenance method for data analysis application, the data security maintenance method including a data selection step of selecting data to be analyzed from a linked database management system (DBMS), a data request step of requesting the data to be analyzed, a data transformation step of transforming the data to be analyzed using a predetermined transformation method, a data analysis step of analyzing the transformed data to be analyzed, an error comparison step of comparing analysis errors for each transformation method, a tradeoff step of determining the extent of analysis accuracy and the extent of data security, and a data provision step of providing the result of analysis of the data to be analyzed.

In order to help understanding of the present invention, a data security maintenance method for data analysis application according to an embodiment of the present invention is shown in the flowchart of FIG. 1, and respective steps thereof will be described hereinafter with reference to the figure.

First, a data selection step (s10) of selecting data to be analyzed is performed.

The data to be analyzed are data in a DBMS managed by a government agency, an enterprise, etc. The data to be analyzed may be selected from a single DBMS. Alternatively, the data to be analyzed may be selected from a plurality of DBMSs as needed.

At the data selection step, it is preferable for an analysis system to select the data to be analyzed from a linked DBMS without passing through a download procedure so as to satisfy the object of the present invention, which is to maintain the security of data. The reason for this is that, in the case in which download is performed, the data to be analyzed are open to an undesired third party, whereby security is weakened.

Subsequently, a data request step (s20) of requesting the data to be analyzed is performed.

After the data to be analyzed are selected, the data to be analyzed are requested in order to transform and analyze the data to be analyzed. In the case in which the data to be analyzed are selected from a single DBMS, as described above, the data to be analyzed are requested from the said DBMS. In the case in which the data to be analyzed are selected from a plurality of DBMSs, on the other hand, the data to be analyzed are requested from all DBMSs that possess the said data.

Subsequently, a data transformation step (s30) of transforming the data to be analyzed is performed. States before and after data transformation according to an embodiment of the present invention are shown in the illustrative view of FIG. 2.

According to what is shown in the figure, it can be seen that data indicating number of customer purchases, customer's total purchase expenditure, and number of customer visits have been transformed in the state in which the customer ID is maintained. It is obvious that data corresponding to the customer ID may also be transformed depending on the circumstances.

The data transformation step includes a step of selecting a predetermined transformation method to be used, a step of selecting the level of the selected transformation method, and a step of transforming the data to be analyzed according to the selected transformation method and the selected level.

The predetermined transformation method may be a topological transformation method, a linear transformation method, or a bicubic transformation method. The above transformation methods are well-known, and therefore a detailed description thereof will be omitted.

The data to be analyzed are transformed using each transformation method. In the present invention, a process of selecting the level of the selected transformation method before transforming the data to be analyzed is further included in order to additionally control the extent of transformation.

Consequently, the analysis result is derived for each transformation method and for each level of the transformation method, and the analysis result is provided to a user through respective steps, a description of which will follow, such that the analysis result can be selected by the user.

Meanwhile, the data transformation step is characterized in that the data to be analyzed are transformed while the characteristics of the data to be analyzed are maintained. That the characteristics of the data to be analyzed are maintained means that both the average and the variance of the data to be analyzed are changed but the analysis result is not affected.

In other words, analysis is performed in the state in which the characteristics of the data to be analyzed are maintained while sensitive particulars of the data to be analyzed are not open to the public. In the present invention, the topological transformation method, the linear transformation method, and the bicubic transformation method are mentioned. Of course, however, various other transformation methods capable of transforming data, such as a normalized data transformation method, may be further used. Appropriate transformation methods may be provided depending on the form and analysis of the data to be analyzed. Consequently, the more transformation methods to be provided, the better.

Subsequently, a data analysis step (s40) of analyzing the transformed data to be analyzed is performed. In data analysis, different analysis processes or analysis results may be provided depending on the purpose of analysis.

Subsequently, an error comparison step (s50) of comparing analysis errors of the data to be analyzed is performed.

In analyzing the data to be analyzed, analysis errors may be used as an index for determining which transformation method is the most efficient. Errors are extracted and compared for each transformation method and for each level of the transformation method.

Consequently, the error comparison step may include a step of calculating analysis errors for each transformation method and a step of comparing the analysis errors calculated for each transformation method.

Because the difference between analysis errors based on actual raw data and analysis errors based on processed data is important, a comparison process is performed in order to determine how low the explanatory power of analysis using the data to be analyzed is.

The analysis errors may be calculated using a root mean square error (RMSE) value or forecast accuracy.

Subsequently, a tradeoff step (s60) of determining the extent of analysis accuracy and the extent of data security is performed before the final analysis result is provided to the user.

This step prepares for the fact that the higher the extent of transformation of the data to be analyzed, the lower the analysis accuracy. The extent of analysis accuracy and the extent of data security are determined using the extent of the analysis errors compared for each transformation method and for each level of the transformation method.

The determination may be performed based on conditions set by the user or by the analysis system. Depending on the circumstances, only a result satisfying predetermined conditions may be automatically extracted.

Finally, a data provision step (s70) of providing the result of analysis of the data to be analyzed to the user is performed.

The analysis result obtained for each transformation method and for each level of the transformation method may be provided as the analysis result. Alternatively, only the analysis result determined at the tradeoff step may be provided.

At this time, the extent of data security may be evaluated based on the difference between the result obtained through the transformation of the data to be analyzed and the result of analysis of the actual data to be analyzed. The maximum difference and the minimum difference may be expressed using %, and therefore "security of xx % is provided" may be displayed.

Meanwhile, different results of the extent of analysis accuracy are derived depending on the transformation method that is applied. For example, the present invention proposes a scheme of utilizing various transformation methods, rather than transformation modeling, as in regression analysis, in which the square of R is utilized, and therefore a detailed description thereof will be omitted.

As a result, the present invention has an advantage in that it is possible to efficiently analyze a large amount of data possessed by a government agency, an enterprise, etc. while maintaining the security of the data.

In addition, the present invention has an advantage in that it is possible to selectively use various transformation methods and levels of each of the transformation methods in order to maintain the security of data, whereby it is possible to obtain an analysis result having the analysis accuracy and data security desired by a user.

Although the present invention has been described with reference to concrete embodiments of the present invention, the embodiments are merely illustrative and do not limit the present invention. It will be apparent to those skilled in the art to which the present invention pertains that the described embodiments may be changed or modified within the scope of the present invention and that various alterations and modifications may be possible within the technical idea of the present invention and the range equivalent to the appended claims.

INDUSTRIAL APPLICABILITY

The present invention relates to a method of performing data analysis while maintaining data security in a big-data environment. The data analysis is more efficiently performed, and the analysis result is used in various industrial fields. Consequently, the industrial applicability of the present invention is very high.

The invention claimed is:

1. A data security maintenance method for data analysis application, the data security maintenance method comprising:
   selecting data to be analyzed from a linked database management system (DBMS);
   requesting the data to be analyzed;
   transforming the data to be analyzed using a plurality of transformation methods;
   analyzing the transformed data;
   comparing analysis errors of the analyzed data;
   determining an extent of analysis accuracy and an extent of data security; and
   providing a result of analysis including the extent of analysis accuracy and the extent of data security,
   wherein comparing the analysis errors comprises:
   calculating the analysis errors for the data transformed through the plurality of transformation methods; and
   comparing the calculated analysis errors to each other,
   wherein the analysis errors are extracted and compared for each of the plurality of transformation methods and for a level of the respective transformation method,
   wherein the analysis errors are calculated using a root mean square error (RMSE) value or forecast accuracy,
   wherein the extent of data security is evaluated based on a difference between a first result obtained through the transformation of the data to be analyzed and a second result obtained through an analysis of the selected data before transformed, and
   wherein a maximum difference and a minimum difference between the first result and the second result are expressed using percentages (%).

2. The data security maintenance method according to claim 1, wherein transforming the data comprises:
   selecting a transformation method from the plurality of transformation methods;
   selecting the level of the selected transformation method; and
   transforming the data to be analyzed according to the selected transformation method and the selected level.

3. The data security maintenance method according to claim 2, wherein the transformation method comprises at least one of a topological transformation method, a linear transformation method, or a bicubic transformation method.

4. The data security maintenance method according to claim 1, wherein, in transforming the data, the data to be analyzed are transformed while characteristics of the data are maintained.

5. The data security maintenance method according to claim 1, wherein, in selecting the data, the data to be analyzed are selected from the linked DBMS without passing through a download procedure.

* * * * *